United States Patent
Sugiyama et al.

(10) Patent No.: US 8,933,878 B2
(45) Date of Patent: Jan. 13, 2015

(54) DISPLAY APPARATUS AND DISPLAY METHOD

(75) Inventors: Yoshikazu Sugiyama, Yokohama (JP); Yutaka Ichihara, Yokohama (JP)

(73) Assignee: Nikon Corporation, Tokyo (JP)

( * ) Notice: Subject to any disclaimer, the term of this patent is extended or adjusted under 35 U.S.C. 154(b) by 102 days.

(21) Appl. No.: 13/545,984

(22) Filed: Jul. 11, 2012

(65) Prior Publication Data

US 2012/0274556 A1 Nov. 1, 2012

Related U.S. Application Data

(63) Continuation of application No. PCT/JP2011/000005, filed on Jan. 5, 2011.

(30) Foreign Application Priority Data

| Jan. 12, 2010 | (JP) | 2010-004365 |
| Feb. 1, 2010 | (JP) | 2010-020678 |
| Feb. 1, 2010 | (JP) | 2010-020700 |

(51) Int. Cl.

| G09G 5/00 | (2006.01) |
| G06F 17/00 | (2006.01) |
| H04N 13/04 | (2006.01) |
| G02B 27/22 | (2006.01) |
| G02B 27/26 | (2006.01) |
| G09G 3/00 | (2006.01) |
| G09G 3/20 | (2006.01) |

(52) U.S. Cl.
CPC ........ H04N 13/0411 (2013.01); G02B 27/2214 (2013.01); G02B 27/26 (2013.01); G09G 3/003 (2013.01); G09G 3/20 (2013.01); H04N 13/0418 (2013.01)
USPC .......................................... 345/156; 345/418

(58) Field of Classification Search
USPC ................. 345/156, 173, 178; 349/62, 64, 65
See application file for complete search history.

(56) References Cited

U.S. PATENT DOCUMENTS

| 6,304,288 B1 | 10/2001 | Hamagishi | |
| 2008/0018559 A1* | 1/2008 | Ochi | 345/59 |
| 2008/0232080 A1* | 9/2008 | Lamberth et al. | 362/19 |

FOREIGN PATENT DOCUMENTS

| JP | 10-232367 | 9/1998 |
| JP | 10-333092 | 12/1998 |
| JP | 2007-108521 | 4/2007 |

OTHER PUBLICATIONS

PCT/IB/338 and PCT/IB/373 for corresponding International Application No. PCT/JP2011/000005, Aug. 16, 2012.
PCT/ISA/237 for corresponding International Application No. PCT/JP2011/000005, Aug. 12, 2011.
International Search Report for corresponding International Application No. PCT/JP2011/000005, Feb. 8, 2011.
Korean Office Action for corresponding KR Application No. 10-2012-7020999, Sep. 16, 2013.
Chinese Office Action for corresponding CN Application No. 201180005745.1, Dec. 13, 2013.

* cited by examiner

*Primary Examiner* — Michael Faragalla
(74) *Attorney, Agent, or Firm* — Mori & Ward, LLP

(57) ABSTRACT

A display apparatus comprising a display panel including first and second display regions arranged in an alternating manner and respectively passing a first polarization component light and a second polarization component of incident light; a light source panel including first and second light sources arranged in an alternating manner and respectively emitting light of the first polarization component and light of the second polarization component to the back surface of the display panel; and a lenticular lens that is positioned between the display panel and the light source panel, refracts light from the first light sources in a direction of a first viewpoint to provide the first viewpoint with the light passed by the first display regions, and refracts light from the second light sources in a direction of a second viewpoint to provide the second viewpoint with the light passed by the second display regions.

17 Claims, 6 Drawing Sheets

DISPLAY APPARATUS AND DISPLAY METHOD

The contents of the following Japanese patent applications are incorporated herein by reference:
NO. 2010-004365 filed on Jan. 12, 2010,
NO. 2010-020678 filed on Feb. 1, 2010, and
NO. 2010-020700 filed on Feb. 1, 2010.

BACKGROUND

1. Technical Field

The present invention relates to a display apparatus and a display method for displaying a stereoscopic image to a viewer.

2. Related Art

An apparatus using a transparent display monitor is known as a stereoscopic display apparatus for the naked eye that provides a stereoscopic image without using specialized glasses. The stereoscopic display apparatus includes a transparent display monitor, left eye and right eye light sources that emit light to the back surface of the transparent display monitor, and a lens having substantially the same size as the transparent display monitor.

The lens is provided between the transparent display monitor and the point light sources. The lens focuses the light from the right-eye point light sources on the right eye of the viewer, and focuses the light from the left-eye point light sources on the left eye of the viewer. In this way, the stereoscopic display apparatus provides a right-eye image only to right eye of the viewer and a left-eye image only to the left eye of the viewer, thereby providing a stereoscopic image to the naked eye of the viewer, without using specialized glasses.

However, when the transparent display monitor of the stereoscopic display apparatus is large, it is difficult to use a lens of substantially the same size. Furthermore, the stereoscopic display apparatus can display a stereoscopic image when the viewer is watching the image from almost directly in front of the display monitor, but has difficulty displaying a stereoscopic image when the viewer is watching from another direction, due to the aberration of the lens.

Furthermore, with the stereoscopic display apparatus, a plurality of viewers cannot watch the stereoscopic image at the same time from different directions.

SUMMARY

In order to solve the above problems, according to a first aspect related to the innovations herein, provided is a display apparatus comprising a display panel including a plurality of first display regions that pass a first polarization component of incident light and a plurality of second display regions that pass a second polarization component of incident light, the first display regions and second display regions being arranged in an alternating manner; a light source panel including a plurality of first light sources that emit light of the first polarization component to the back surface of the display panel and a plurality of second light sources that emit light of the second polarization component to the back surface of the display panel, the first light sources and second light sources being arranged in an alternating manner; and a lenticular lens that is positioned between the display panel and the light source panel, refracts the light from the first light sources in a direction of a first viewpoint to provide the first viewpoint with the light passed by the first display regions, and refracts the light from the second light sources in a direction of a second viewpoint to provide the second viewpoint with the light passed by the second display regions. Also provided is a display method using this display apparatus.

According to a second aspect related to the innovations herein, provided is a display apparatus comprising a display panel that displays a first image at a first timing and a second image at a second timing; a light source panel that includes a plurality of first light sources and a plurality of second light sources that emit light to a back surface of the display panel; a lenticular lens that is positioned between the display panel and the light source panel, refracts the light from the first light sources in a direction of a first viewpoint to provide the first viewpoint with the light, and refracts the light from the second light sources in a direction of a second viewpoint to provide the second viewpoint with the light; and a light source control section that causes the first light sources to light up and the second light sources to go dark at the first timing, and causes the second light sources to light up and the first light sources to go dark at the second timing.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
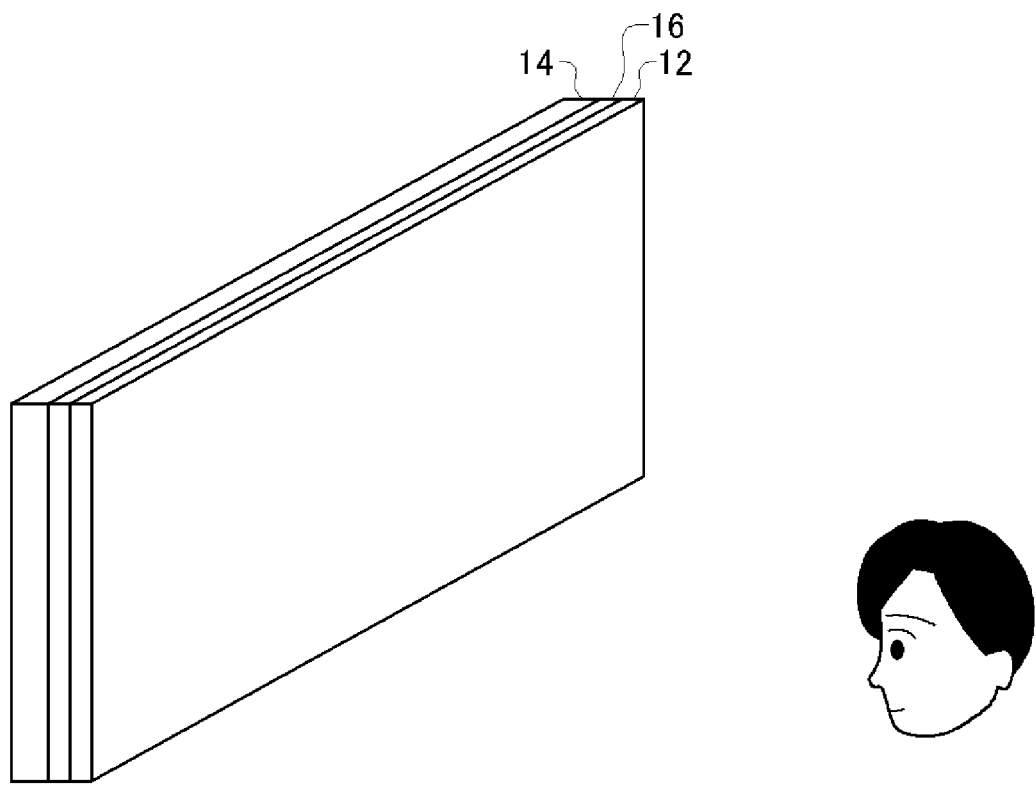
FIG. 1 shows a configuration of a display apparatus 10 according to an embodiment of the present invention.
Figure 2:
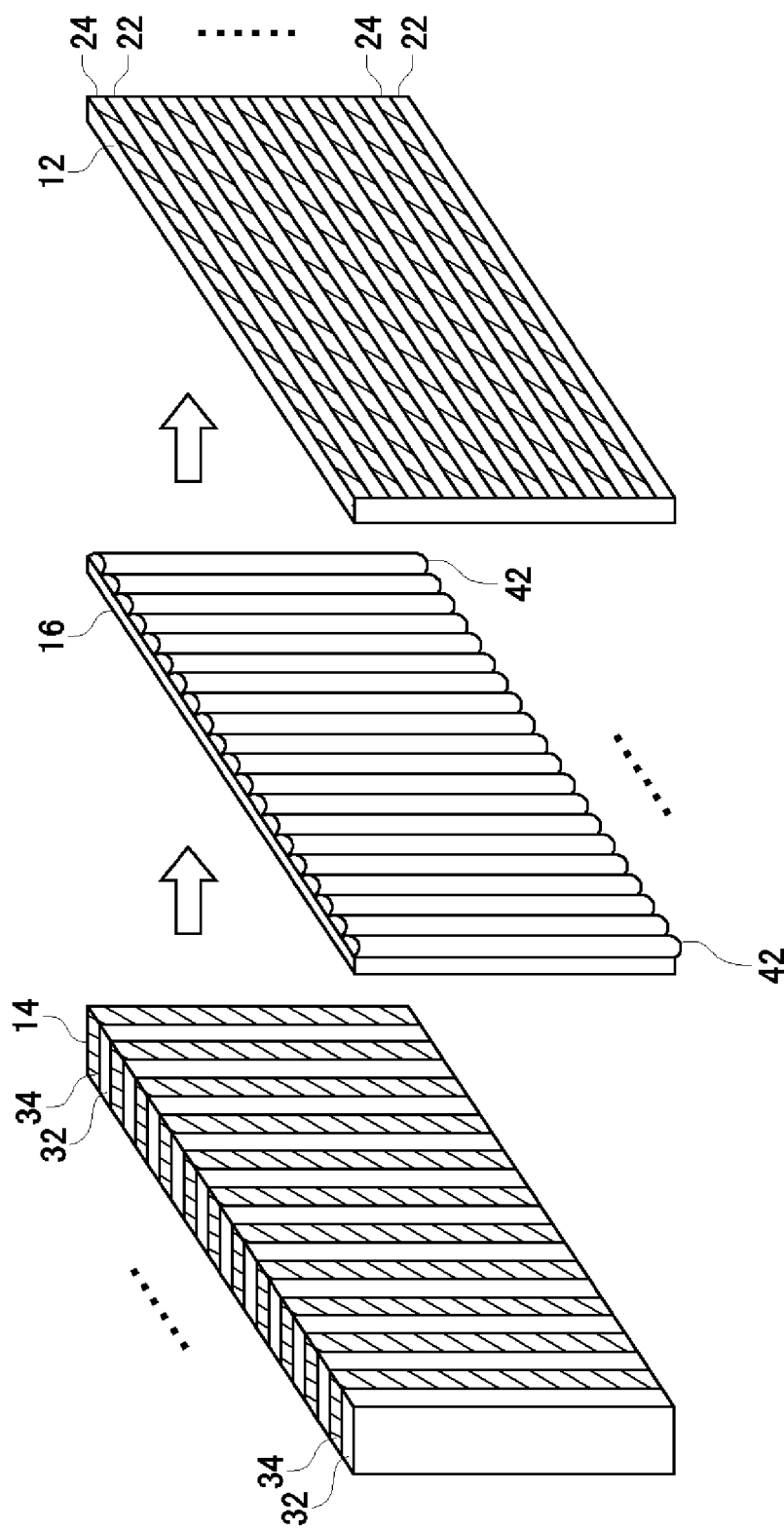
FIG. 2 shows a configuration of a display panel 12, a light source panel 14, and a lenticular lens 16, which are included in the display apparatus 10 according to the present embodiment.

FIG. 1 shows a configuration of a display apparatus 10 according to an embodiment of the present invention. FIG. 2 shows a configuration of a display panel 12, a light source panel 14, and a lenticular lens 16, which are included in the display apparatus 10 according to the present embodiment.

The display apparatus 10 receives image data including a right-eye image and a left-eye image for displaying a stereoscopic image, from a receiving apparatus or a playing apparatus, for example. The display apparatus 10 can provide the right-eye image to only the right eye of a viewer, and the left-eye image to only the left eye of the viewer. The display apparatus 10 can enable a stereoscopic image to be seen by a viewer who is not wearing specialized glasses for separating images, i.e. by a viewer using the naked eye.

The display apparatus 10 includes the display panel 12, the light source panel 14, and the lenticular lens 16. The display panel 12 displays the right-eye image and the left-eye image.

The display panel 12 is a transparent panel that provides the viewer with the displayed images by passing light emitted from a back surface side thereof.

The display panel 12 includes a plurality of first display regions 22 that pass a first polarization component of incident light and a plurality of second display regions 24 that pass a second polarization component of the incident light, and the first display regions 22 and second display regions 24 are arranged in an alternating manner. For example, the display panel 12 may display the right-eye image in the first display regions 22 and display the left-eye image in the second display regions 24. The light of the first polarization component and the light of the second polarization component may be linearly polarized light having polarization directions orthogonal to each other, or may be circularly polarized light having opposite rotational directions from each other.

Each of the first display regions 22 and second display regions 24 may extend in a horizontal direction (left-right direction) of the display panel 12, and may be arranged in an alternating manner in a vertical direction (up-down direction) of the display panel 12. The display panel 12 may include horizontal lines that pass light of the first polarization component and horizontal lines that pass light of the second polarization component, arranged in an alternating manner, for example.

The light source panel 14 emits light to the back surface of the display panel 12. The light emitted to the back surface of the display panel 12 passes through the display panel 12 to be provided to the viewer. As a result, the viewer can see the image displayed by the display panel 12.

The light source panel 14 includes a plurality of first light sources 32 that emit light of the first polarization component to the back surface of the display panel 12 and a plurality of second light sources 34 that emit light of the second polarization component to the back surface of the display panel 12, arranged in an alternating manner in the horizontal direction. Each of the first light sources 32 and second light sources 34 may extend in the vertical direction of the display panel 12, from the top edge to the bottom edge of the display panel 12, for example. Each of the first light sources 32 and second light sources 34 can emit light that is uniform in the vertical direction of the display panel 12.

The lenticular lens 16 is provided between the display panel 12 and the light source panel 14. The lenticular lens 16 refracts the light from the first light sources 32 in a direction of a first viewpoint, to provide the light passed through the first display regions 22 to the first viewpoint corresponding to the right eye of the viewer. Furthermore, the lenticular lens 16 refracts the light from the second light sources 34 in a direction of a second viewpoint, to provide the light passed through the second display regions 24 to the second viewpoint corresponding to the left eye of the viewer.

The lenticular lens 16 may include a plurality of lenses 42 that each extend in the vertical direction of the display panel 12, from the top edge to the bottom edge of the display panel 12, for example. The lenses 42 are lined up in the horizontal direction of the display panel 12, from the right edge to the left edge of the display panel 12.

Figure 3:
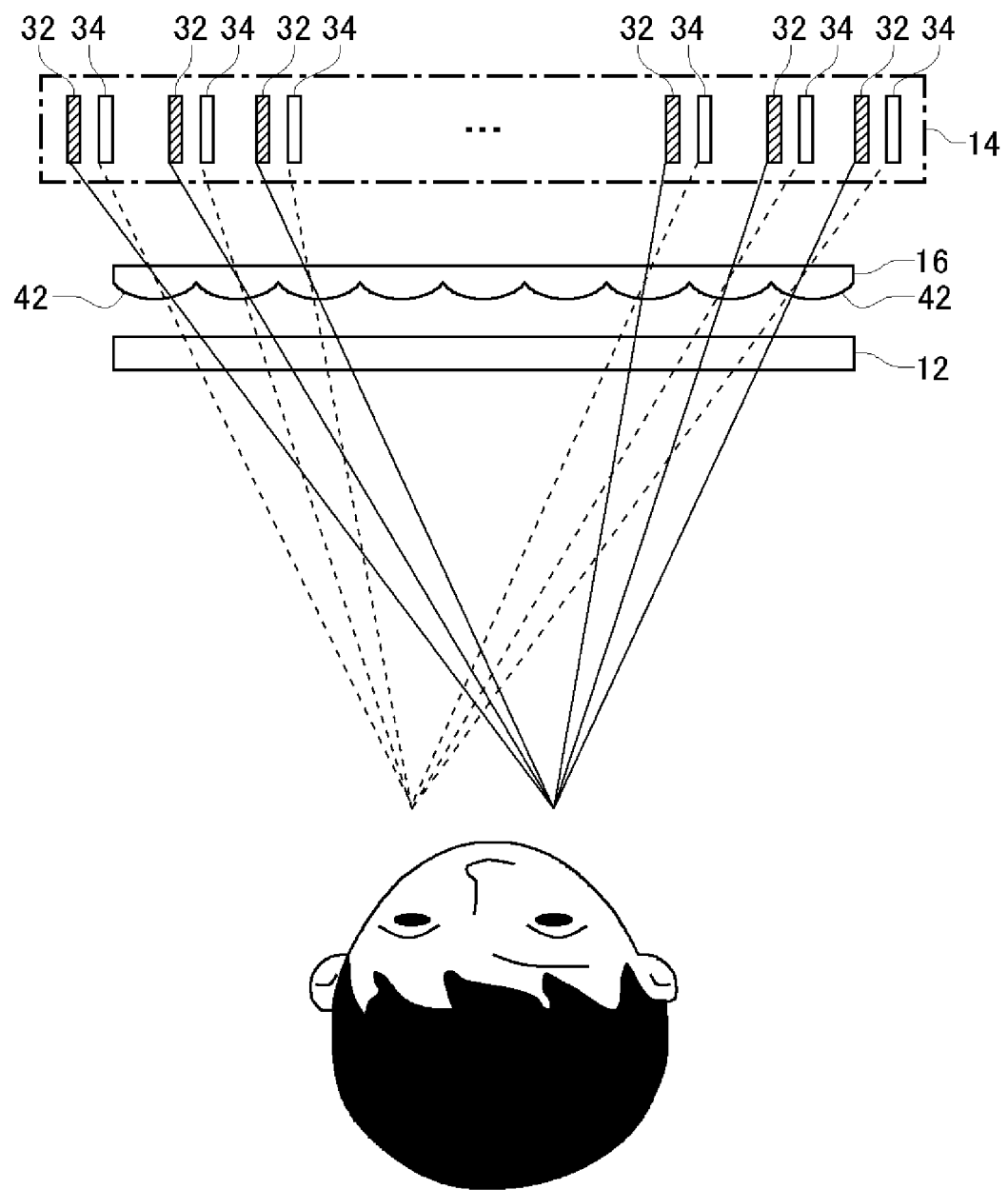
FIG. 3 shows an example of light provided to the viewer from the display apparatus 10 according to the present embodiment.

FIG. 3 shows an example of light provided to the viewer from the display apparatus 10 according to the present embodiment. With the display apparatus 10, the light of the first polarization component output from the first light sources 32 is refracted by the lenticular lens 16 in a direction of the first viewpoint corresponding to the right eye of the viewer. The light of the first polarization component refracted by the lenticular lens 16 passes through the first display regions 22 of the display panel 12 to be provided to the right eye of the viewer.

Furthermore, with the display apparatus 10, the light of the second polarization component output from the second light sources 34 is refracted by the lenticular lens 16 in a direction of the second viewpoint corresponding to the left eye of the viewer. The light of the second polarization component refracted by the lenticular lens 16 passes through the second display regions 24 of the display panel 12 to be provided to the left eye of the viewer.

The display panel 12 displays the right-eye image in the first display regions 22. The display panel 12 displays the left-eye image in the second display regions 24. Accordingly, the display apparatus 10 can provide the right-eye image displayed in the first display regions 22 to the first viewpoint corresponding to the right eye of the viewer, and provide the left-eye image displayed in the second display regions 24 to the second viewpoint corresponding to the left eye of the viewer.

In this way, the display apparatus 10 enables a viewer not wearing specialized glasses to view a stereoscopic image with the naked eye. Furthermore, with the display apparatus 10, since a lenticular lens 16 is used instead of a single large lens, the display surface can be large and thin.

Figure 4:
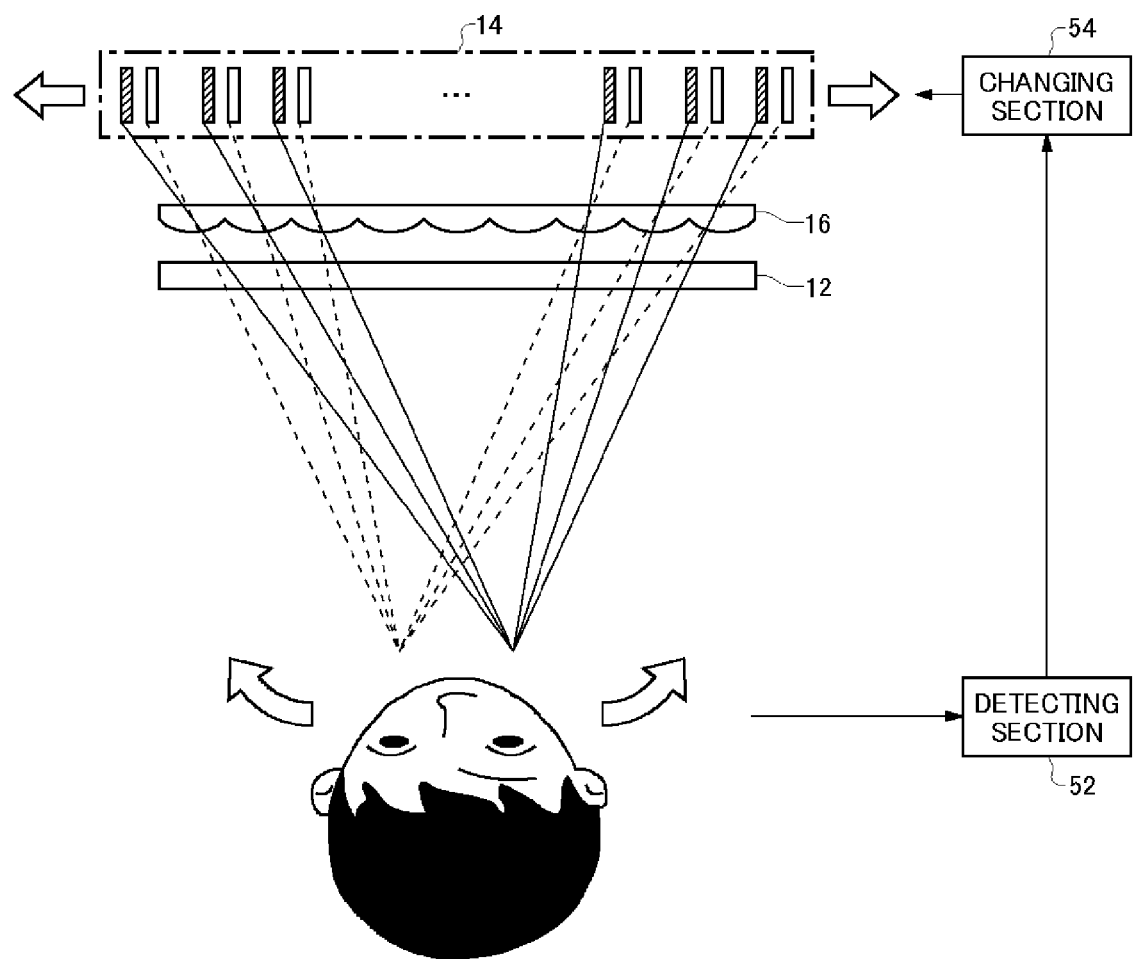
FIG. 4 shows a configuration of a display apparatus 10 according to a first modification.

FIG. 4 shows a configuration of a display apparatus 10 according to a first modification. The display apparatus 10 of the present modification adopts substantially the same function and configuration as the display apparatus 10 described in FIGS. 1 to 3, and therefore components that have substantially the same function and configuration as those described in FIGS. 1 to 3 are given the same reference numerals, and the following description includes only differing points.

The first display apparatus 10 further includes a detecting section 52 and a changing section 54. In the present modification, the first light sources 32 and the second light sources 34 of the light source panel 14 can be moved in the horizontal direction of the display panel 12. In this case, the first light sources 32 and the second light sources 34 may be movable integrally with the lenticular lens 16.

The detecting section 52 detects the position of the viewer. For example, the detecting section 52 may recognize the head or face of the viewer by capturing an image thereof with a camera, and detect the positions of the right and left eyes of the viewer relative to the display panel 12.

The changing section 54 moves the first light sources 32 and the second light sources 34 in the horizontal direction of the display panel 12, according to the detected position of the viewer, to change the orientation of the first viewpoint and second viewpoint relative to the display panel 12. For example, the changing section 54 may store in advance a correspondence relationship between the position of the viewer and the movement position of the light source panel 14 in a table, and move the first light sources 32 and the second light sources 34 to a position based on the content of the table and the detected position of the viewer. The changing section 54 may move the first light sources 32 and the second light sources 34 en masse, or may move each one independently.

In this way, the display apparatus 10 can enable a viewer to view a stereoscopic image from a variety of positions relative to the display screen. Furthermore, with the display apparatus 10, the viewer can move while continuing to view the stereoscopic image.

The first light sources 32 and second light sources 34 are arranged densely to correspond to the entire back surface of the display panel 12, and may be independently controlled to light up or go dark. In this case, the changing section 54 controls each first light source 32 and second light source 34 to light up or go dark independently.

The changing section 54 performs control according to the detected position of the viewer, to change the regions emitting light of the first polarization component and the regions emitting light of the second polarization component. The light source panel 14 is controlled by the changing section 54 to change the positions of the borders between adjacent first light sources 32 and second light sources 34 among the plurality of first light sources 32 and second light sources 34, thereby changing the emission direction of the light of the first polarization component and the light of the second polarization component. With the display apparatus 10 according to the present modification, the viewer can view the stereoscopic image from a variety of positions.

Figure 5:
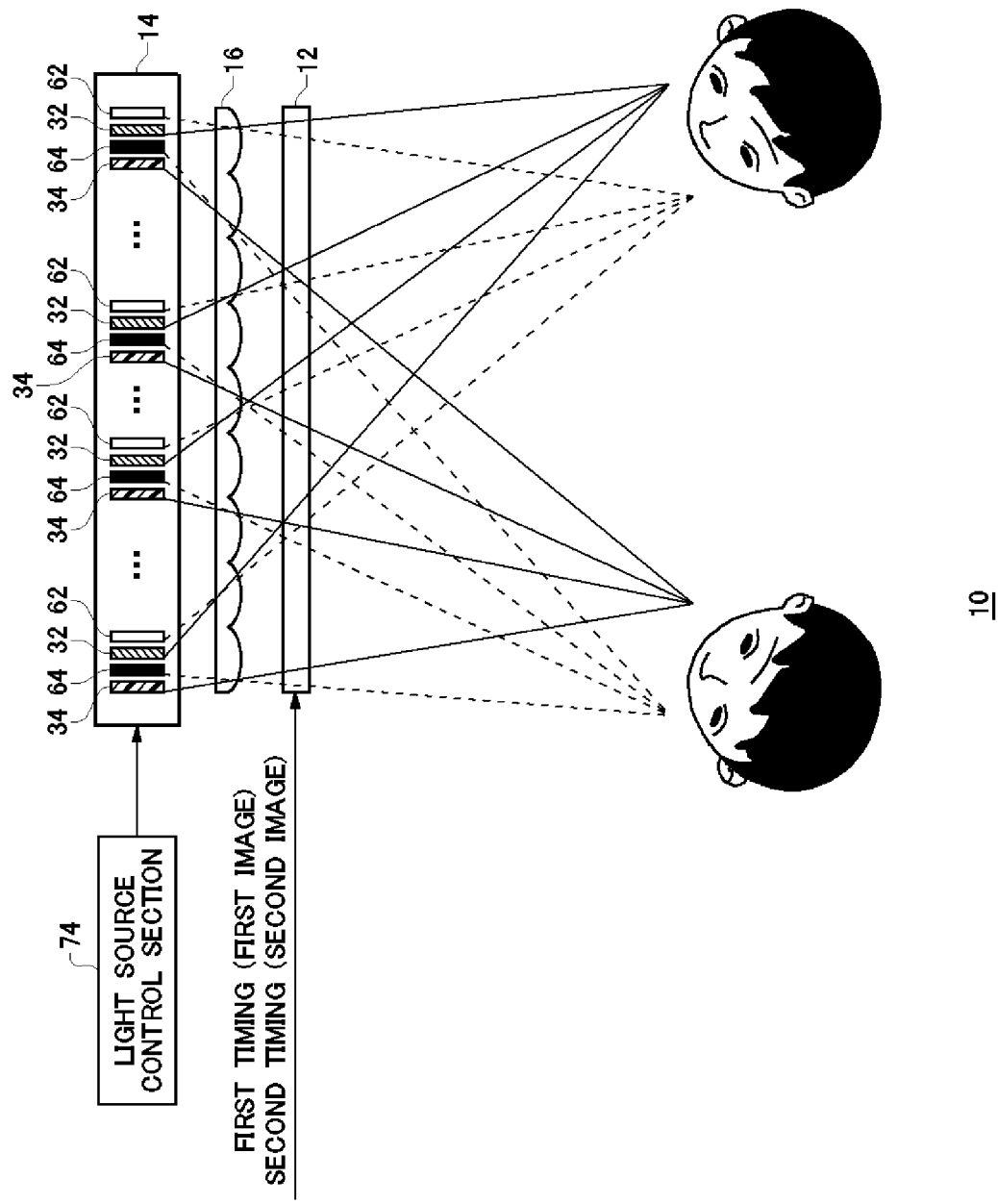
FIG. 5 shows a configuration of the display apparatus 10 according to a second modification.

FIG. 5 shows a configuration of the display apparatus 10 according to a second modification. The display apparatus 10 of the present modification adopts substantially the same function and configuration as the display apparatuses 10 described in FIGS. 1 to 4, and therefore components that have substantially the same function and configuration as those described in FIGS. 1 to 4 are given the same reference numerals, and the following description includes only differing points.

The display apparatus 10 of the present modification provides each of a plurality of viewers, who are viewing the display apparatus 10 from a plurality of viewpoints and are not wearing specialized glasses for image separation, with a different stereoscopic image corresponding to the viewpoint.

In this example, the display apparatus 10 provides a first viewer and a second viewer with stereoscopic images corresponding to the respective viewpoints of the viewers. In other words, the display apparatus 10 provides a first image for the right eye to a first viewpoint corresponding to the right eye of the first viewer and provides a first image for the left eye to a third viewpoint corresponding to the left eye of the first viewer. Furthermore, the display apparatus 10 provides a second image for the right eye to a second viewpoint corresponding to the right eye of the second viewer and provides a second image for the left eye to a fourth viewpoint corresponding to the left eye of the second viewer.

The first image for the right eye is an image that is viewed when one subject is seen from a position corresponding to the right eye of the first viewer. The first image for the left eye is an image that is viewed when one subject is seen from a position corresponding to the left eye of the first viewer. The second image for the right eye is an image that is viewed when one subject is seen from a position corresponding to the right eye of the second viewer. The second image for the left eye is an image that is viewed when one subject is seen from a position corresponding to the left eye of the second viewer. These images may be images that are actually captured by a camera, or may be images generated by computer processing, for example.

The display apparatus 10 includes the display panel 12, the light source panel 14, the lenticular lens 16, and a light source control section 74.

The display panel 12 displays the first image and the second image in an alternating manner. More specifically, at a first timing, the display panel 12 displays the first image for the right eye in the first display regions 22 that pass the first polarization component and displays the first image for the left eye in the second display regions 24 that pass the second polarization component. At a second timing, the display panel 12 displays the second image for the right eye in the first display regions 22 and displays the second image for the left eye in the second display regions 24.

The light source panel 14 includes a plurality of first light sources 32 and third light sources 62 that emit light of the first polarization component to the back surface of the display panel 12. The first light sources 32 and third light sources 62 are arranged in an alternating manner in the horizontal direction of the display panel 12.

The light source panel 14 includes a plurality of second light sources 34 and fourth light sources 64 that emit light of the second polarization component to the back surface of the display panel 12. The second light sources 34 and fourth light sources 64 are arranged in an alternating manner in the horizontal direction of the display panel 12.

The first light sources 32, the second light sources 34, the third light sources 62, and the fourth light sources 64 each extend in the vertical direction of the display panel 12 from the top edge to the bottom edge of the display panel 12, and are arranged from the right edge to the left edge of the display panel 12, for example. Therefore, the first light sources 32, the second light sources 34, the third light sources 62, and the fourth light sources 64 can each emit light uniformly in the vertical direction of the display panel 12.

The lenticular lens 16 refracts the light from the first light sources 32 in a direction of the first viewpoint, to provide the light passed by the first display regions 22 to the first viewpoint corresponding to the right eye of the first viewer. The lenticular lens 16 refracts the light from the second light sources 34 in a direction of the second viewpoint, to provide the light passed by the first display regions 22 to the second viewpoint corresponding to the right eye of the second viewer.

The lenticular lens 16 refracts the light from the third light sources 62 in a direction of the third viewpoint, to provide the light passed by the second display regions 24 to the third viewpoint corresponding to the left eye of the first viewer. The lenticular lens 16 refracts the light from the fourth light sources 64 in a direction of the fourth viewpoint, to provide the light passed by the second display regions 24 to the fourth viewpoint corresponding to the left eye of the second viewer.

The light source control section 74 controls each of the first light sources 32, second light sources 34, third light sources 62, and fourth light sources 64 to light up and go dark independently. More specifically, at a first timing, the light source control section 74 causes the first light sources 32 to light up and causes the second light sources 34 to go dark. Furthermore, at the first timing, the light source control section 74 causes the third light sources 62 to light up and causes the fourth light sources 64 to go dark.

At a second timing, the light source control section 74 causes the second light source 34 to light up and causes the first light sources 32 to go dark. Furthermore, at the second timing, the light source control section 74 causes the fourth light sources 64 to light up and causes the third light sources 62 to go dark.

With the display apparatus 10, the light of the first polarization component output from the first light sources 32 is refracted by the lenticular lens 16 in the direction of the first viewpoint corresponding to the right eye of the first viewer. This light of the first polarization component passes through the first display regions 22 of the display panel 12 to be provided to the right eye of the first viewer.

With the display apparatus 10, the light of the second polarization component output from the third light sources 62 is refracted by the lenticular lens 16 in the direction of the third viewpoint corresponding to the left eye of the first viewer. This light of the second polarization component passes through the second display regions 24 of the display panel 12 to be provided to the left eye of the first viewer.

With the display apparatus 10, the light of the first polarization component output from the second light sources 34 is refracted by the lenticular lens 16 in the direction of the second viewpoint corresponding to the right eye of the second viewer. This light of the first polarization component passes through the first display regions 22 of the display panel 12 to be provided to the right eye of the second viewer.

With the display apparatus 10, the light of the second polarization component output from the fourth light sources 64 is refracted by the lenticular lens 16 in the direction of the fourth viewpoint corresponding to the left eye of the second viewer. This light of the second polarization component passes through the second display regions 24 of the display panel 12 to be provided to the left eye of the second viewer.

At the first timing, the light source control section 74 causes the first light sources 32 and the third light sources 62 to light up, and the display panel 12 displays the first image for the right eye in the first display regions 22 and displays the first image for the left eye in the second display regions 24. In this way, at the first timing, the display apparatus 10 can provide the first image for the right eye displayed in the first display regions 22 to the first viewpoint corresponding to the right eye of the first viewer, and provide the first image for the left eye displayed in the second display regions 24 to the third viewpoint corresponding to the left eye of the first viewer.

Furthermore, at the second timing, the light source control section 74 causes the second light sources 34 and the fourth light sources 64 to light up, and the display panel 12 displays the second image for the right eye in the first display regions 22 and displays the second image for the left eye in the second display regions 24. In this way, at the second timing, the display apparatus 10 can provide the second image for the right eye displayed in the first display regions 22 to the second viewpoint corresponding to the right eye of the second viewer, and provide the second image for the left eye displayed in the second display regions 24 to the fourth viewpoint corresponding to the left eye of the second viewer.

At the first timing, the light source control section 74 causes the second light sources 34 and the fourth light sources 64 to go dark. Accordingly, at the first timing, the display apparatus 10 does not provide any images to the second viewer. Furthermore, at the second timing, the light source control section 74 causes the first light sources 32 and the third light sources 62 to go dark. Accordingly, at the second timing, the display apparatus 10 does not provide any images to the first viewer.

The display apparatus 10 alternates between the first timing and the second timing at a speed high enough to be unrecognizable by the viewers, e.g. one alternation each frame. Therefore, the display apparatus 10 can provide the first viewer and the second viewer, who are not wearing specialized glasses for image separation, with stereoscopic images corresponding to the respective viewpoints of the viewers.

The display apparatus 10 of the present modification may provide three or more viewers with stereoscopic images corresponding respectively to the viewpoints of the viewers. In this case, for each of the three or more viewers, the light source panel 14 includes a plurality of right-eye light sources that emit light of the first polarization component to the back surface of the display panel 12 and a plurality of left-eye light sources that emit light of the second polarization component to the back surface of the display panel 12. Furthermore, the lenticular lens 16 provides the right eye of each viewer with light of the right-eye light sources corresponding to the viewer and provides the left eye of each viewer with light of the left-eye light sources corresponding to the viewer.

The light source control section 74 allocates timings sequentially to each of the three or more viewers and, at each of the respective timings, causes the right-eye light sources and left-eye light sources corresponding to the allocated viewer to light up and causes the right-eye light sources and left-eye light sources corresponding to the non-allocated viewers to go dark. At each of the respective timings, the display panel 12 displays the image to be provided to the right eye of the allocated viewer in the first display regions and displays the image to be provided to the left eye of the allocated viewer in the second display regions. In this way, even when there are three or more viewers, the display apparatus 10 can provide stereoscopic images corresponding to the viewpoint of each viewer.

The display apparatus 10 according to the present modification may include a detecting section 52 and a changing section 54, such as described in FIG. 3. In this case, the detecting section 52 detects the position of the first viewer and the position of the second viewer. The changing section 54 moves the first light sources 32, the second light sources 34, the third light sources 62, and the fourth light sources 64 in the horizontal direction of the display panel 12, according to the detected positions of the first viewer and the second viewer, to change the orientation of the first viewpoint, second viewpoint, third viewpoint, and fourth viewpoint relative to the display panel 12. In this way, the display apparatus 10 enables the first viewer and the second viewer to each view the stereoscopic images from a variety of positions.

The first light sources 32, second light sources 34, third light sources 62, and fourth light sources 64 are arranged densely to correspond to the entire back surface of the display panel 12, and may each be controlled independently to light up and go dark. In this case, the changing section 54 controls each of the first light sources 32 and second light sources 34 to light up or go dark according to the detected positions of the viewers, to change the regions that emit light of the first polarization component and the regions that emit light of the second polarization component.

The light source panel 14 is controlled by the changing section 54 to change the positions of the borders between adjacent first light sources 32 and second light sources 34 among the plurality of first light sources 32 and second light sources 34, thereby changing the emission direction of the light of the first polarization component and the light of the second polarization component. With the display apparatus 10 according to the present modification, the viewers can view the stereoscopic images from a variety of positions.

Figure 6:
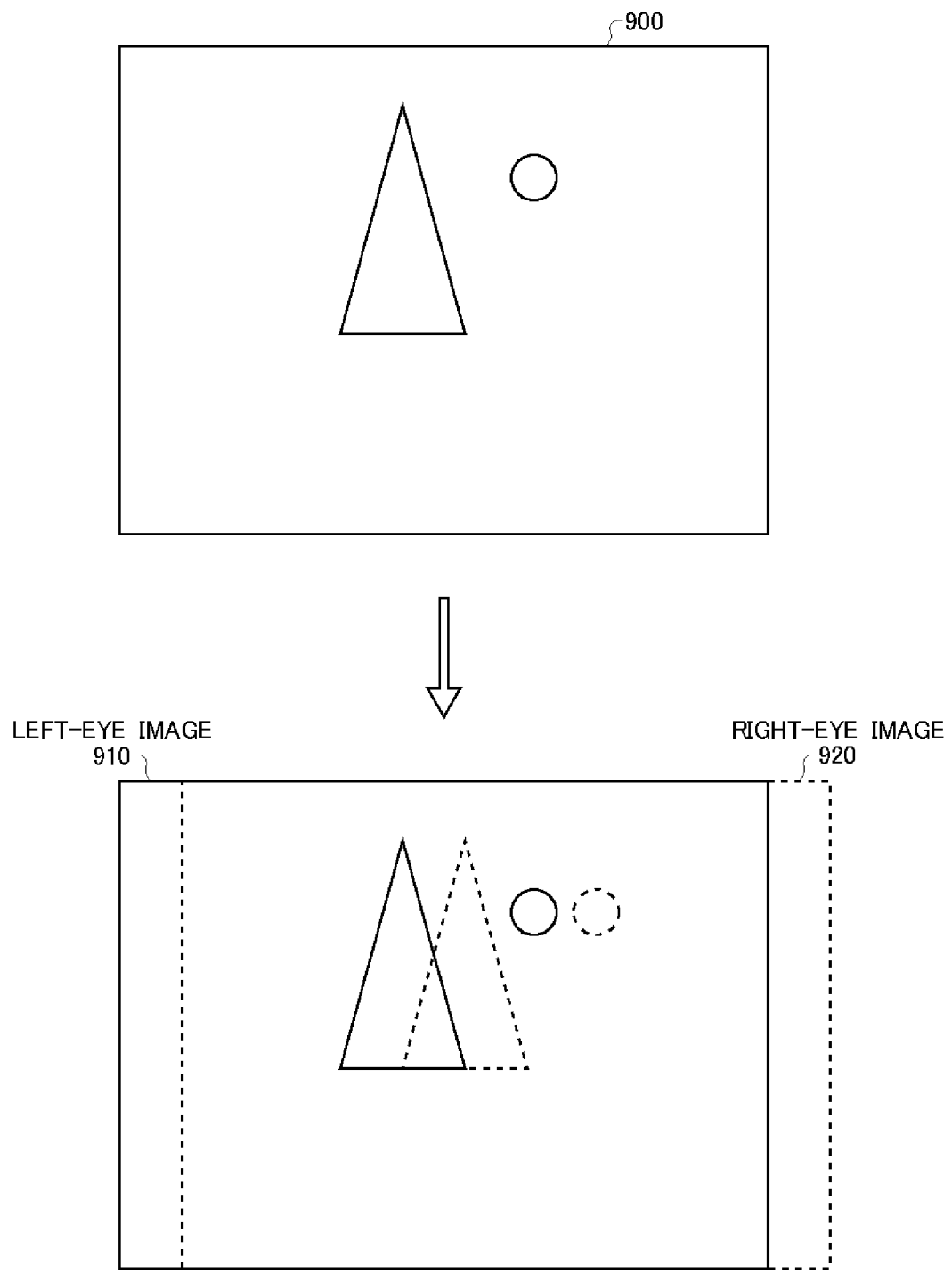
FIG. 6 shows an exemplary method for generating the right-eye image and the left-eye image.

FIG. 6 shows an exemplary method for generating the right-eye image and the left-eye image. The display apparatus 10 may generate the right-eye image and the left-eye image from one two-dimensional image.

In this case, an image generating section included in the display apparatus 10 generates a right-eye image 920 and a left-eye image 910 by shifting one image 900 to the left and right. In this way, the image generating section of the display apparatus 10 can generate the right-eye image 920 and the left-eye image 910 used for the stereoscopic image from an image that was not generated for use as a stereoscopic image, by using a simple process.

More specifically, the image generating section generates the right-eye image 920 by shifting the image 900 horizontally to the right and generates the left-eye image 910 by shifting the image 900 horizontally to the left. In this case, the image generating section performs the shifting such that the difference in position between the left-eye image 910 and the right-eye image 920 in the horizontal direction is no greater than the distance L between pupils of the viewer. For example, the image generating section may generate the left-eye image 910 by shifting the image 900 to the left by L/2 and generate the right-eye image 920 by shifting the image 900 to the right by L/2.

Here, the distance L between the pupils may be the distance between the pupils of the viewer, e.g. from 40 mm to 90 mm. The distance between the pupils may be a value determined in advance by the image generating section, or may be provided to the image generating section as information indicating a distance between pupils input by the viewer. When the left-eye image and the right-eye image are displayed at positions separated by the distance L between the pupils and the viewer perceives the left-eye image provided to the left eye of the viewer and the right-eye image provided to the right eye of the viewer together as a single image, the viewer perceives the combined image as being positioned infinitely far away. Accordingly, the image generating section generates the right-eye image and the left-eye image such that the positions of the right-eye image and left-eye image are separated by no more than the distance L between the pupils, and therefore the display apparatus 10 can provide a stereoscopic image to the viewer.

When the left-eye image and the right-eye image are generated by shifting a common image to the left and right, an empty portion is created at the left edge of the right-eye image. Similarly, an empty portion is created at the right edge of the left-eye image. Since each image can be provided to only one of the right eye and the left eye, these empty portions can be detrimental to the viewer naturally perceiving the stereoscopic image.

Therefore, the image generating section may add a left-edge image to the empty portion at the left edge of the right-eye image and add a right-edge image to the empty portion at the right edge of the left-eye image, for example. The image generating section may generate the right-edge image by copying the image of the right-edge region of the right-eye image, and may generate the left-edge image by copying the image of the left-edge region of the left-eye image. In this case, the image generating section may blur the right-edge image and the left-edge image. In this way, the image generating section can display images with the same edge portions to both the right eye and the left eye, and can decrease the sense of unnaturalness perceived at the edges by the viewer.

As another example, the image generating section may generate the left-edge image by expanding a prescribed range from the left edge of the display region of the right-eye image to the left and generate the right-edge image by expanding a prescribed range from the right edge of the display region of the left-eye image to the right, for example. In this way, the image generating section can provide the viewer with a natural stereoscopic image that is continuous at the edge portions.

As another example, the image generating section may display a frame image, such as a black frame, in the right edge portion and the left edge portion of the respective right-eye image and left-eye image. In this way, the image generating section can eliminate the regions at the left and right edges that do not appear stereoscopic, and can provide the stereoscopic impression in all regions within the frame. Furthermore, by displaying such a frame image, the viewer can be provided with the sensation of looking at an object through a frame, such as a window frame or a magnifying glass frame, thereby providing the viewer with a natural stereoscopic sensation. Furthermore, there are cases where the viewer can be encouraged to combine the right-eye image and the left-eye image by displaying such a frame image.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A display apparatus comprising:
    a display panel including a plurality of first display regions that pass a first polarization component of incident light and a plurality of second display regions that pass a second polarization component of incident light, the first display regions and second display regions being arranged in an alternating manner;
    a light source panel including a plurality of first light sources that emit light of the first polarization component to the back surface of the display panel and a plurality of second light sources that emit light of the second polarization component to the back surface of the display panel, the first light sources and second light sources being arranged in an alternating manner; and
    a lenticular lens that is positioned between the display panel and the light source panel, refracts the light from the first light sources in a direction of a first viewpoint to provide the first viewpoint with the light passed by the first display regions, and refracts the light from the second light sources in a direction of a second viewpoint to provide the second viewpoint with the light passed by the second display regions, wherein
    the light from the first light sources creates a right-eye image, the light from the second light sources creates a left-eye image, and together the right-eye image and the left-eye image form a stereoscopic image.

2. The display apparatus according to claim 1, wherein
    the lenticular lens includes a plurality of lenses that each extend in a vertical direction of the display panel, and
    the lenses are lined up in a horizontal direction of the display panel.

3. The display apparatus according to claim 1, wherein
    the first light sources and second light sources in the light source panel are arranged in an alternating manner in a horizontal direction.

4. The display apparatus according to claim 1, wherein
    the first display regions and the second display regions each extend in a horizontal direction of the display panel, and are arranged in an alternating manner in a vertical direction of the display panel.

5. The display apparatus according to claim 1, wherein
    the display apparatus provides a right-eye image displayed in the first display regions to the first viewpoint corresponding to a right eye of a viewer, and provides a left-eye image displayed in the second display regions to the second viewpoint corresponding to a left eye of the viewer.

6. The display apparatus according to claim 5, further comprising:
a detecting section that detects the position of the viewer; and
a changing section that, according to the detected position of the viewer, moves the first light sources and the second light sources in a horizontal direction of the display panel to change orientations of the first viewpoint and the second viewpoint relative to the display panel.

7. The display apparatus according to claim 6, wherein the light source panel is controlled by the changing section to change border positions between adjacent first light sources and second light sources among the plurality of first light sources and second light sources, thereby changing emission directions of the light of the first polarization component and the light of the second polarization component.

8. The display apparatus according to claim 1, wherein a plurality of third light sources that emit light of the first polarization component to the back surface of the display panel and a plurality of fourth light sources that emit light of the second polarization component to the back surface of the display panel are also arranged in an alternating manner in the light source panel, and
the lenticular lens refracts light from the third light sources in a direction of a third viewpoint to provide the third viewpoint with the light passed by the first display regions, and refracts light from the fourth light sources in a direction of a fourth viewpoint to provide the fourth viewpoint with the light passed by the second display regions.

9. A display apparatus comprising:
a display panel that displays a first image at a first timing and a second image at a second timing;
a light source panel that includes a plurality of first light sources and a plurality of second light sources that emit light to a back surface of the display panel;
a lenticular lens that is positioned between the display panel and the light source panel, refracts the light from the first light sources in a direction of a first viewpoint to provide the first viewpoint with the light, and refracts the light from the second light sources in a direction of a second viewpoint to provide the second viewpoint with the light; and
a light source control section that causes the first light sources to light up and the second light sources to go dark at the first timing, and causes the second light sources to light up and the first light sources to go dark at the second timing, wherein
the light from the first light sources creates a right-eye image, the light from the second light sources creates a left-eye image, and together the right-eye image and the left-eye image form a stereoscopic image.

10. The display apparatus according to claim 9, wherein in the display panel, a plurality of first display regions that pass a first polarization component of incident light and a plurality of second display regions that pass a second polarization component of incident light are arranged in an alternating manner,
the first light sources and the second light sources emit light of the first polarization component to the back surface of the display panel,
the light source panel further includes a plurality of third light sources and a plurality of fourth light sources that emit light of the second polarization component to the back surface of the display panel,
the lenticular lens further refracts the light from the third light sources in a direction of a third viewpoint to provide the third viewpoint with the light, and refracts the light from the fourth light sources in a direction of a fourth viewpoint to provide the fourth viewpoint with the light, and
the light source control section further causes the third light sources to light up and the fourth light sources to go dark at the first timing, and causes the fourth light sources to light up and the third light sources to go dark at the second timing.

11. The display apparatus according to claim 10, wherein the lenticular lens includes a plurality of lenses that each extend in a vertical direction of the display panel, and
the lenses are lined up in a horizontal direction of the display panel.

12. The display apparatus according to claim 10, wherein the first light sources and the third light sources in the light source panel are arranged in an alternating manner in a horizontal direction, and
the second light sources and the fourth light sources in the light source panel are arranged in an alternating manner in the horizontal direction.

13. The display apparatus according to claim 10, wherein the first display regions and the second display regions each extend in a horizontal direction of the display panel, and are arranged in an alternating manner in a vertical direction of the display panel.

14. The display apparatus according to claim 10, wherein the display apparatus:
provides the first image for a right eye displayed in the first display regions to the first viewpoint corresponding to a right eye of a first viewer,
provides the first image for a left eye displayed in the second display regions to the third viewpoint corresponding to a left eye of the first viewer,
provides the second image for a right eye displayed in the first display regions to the second viewpoint corresponding to a right eye of a second viewer, and
provides the second image for a left eye displayed in the second display regions to the fourth viewpoint corresponding to a left eye of the second viewer.

15. The display apparatus according to claim 14, further comprising:
a detecting section that detects positions of the first viewer and the second viewer; and
a changing section that, according to the detected positions of the first viewer and the second viewer, moves the first light sources, the second light sources, the third light sources, and the fourth light sources in a horizontal direction of the display panel to change orientations of the first viewpoint, the second viewpoint, the third viewpoint, and the fourth viewpoint relative to the display panel.

16. The display apparatus according to claim 15, wherein the light source panel is controlled by the changing section to change border positions between adjacent first light sources and third light sources among the plurality of first light sources and third light sources and to change border positions between adjacent second light sources and fourth light sources among the plurality of second light sources and fourth light sources, thereby changing emission directions of the light of the first polarization component and the light of the second polarization component.

17. A display method using a display apparatus that includes:
- a display panel that displays a first image at a first timing and a second image at a second timing;
- a light source panel that includes a plurality of first light sources and a plurality of second light sources that emit light to a back surface of the display panel; and
- a lenticular lens that is positioned between the display panel and the light source panel, refracts the light from the first light sources in a direction of a first viewpoint to provide the first viewpoint with the light, and refracts the light from the second light sources in a direction of a second viewpoint to provide the second viewpoint with the light, the display method comprising:
- causing the first light sources to light up and the second light sources to go dark at the first timing, and causing the second light sources to light up and the first light sources to go dark at the second timing, wherein
- the light from the first light sources creates a right-eye image, the light from the second light sources creates a left-eye image, and together the right-eye image and the left-eye image form a stereoscopic image.

* * * * *